United States Patent
Hiyanagi (10) Patent No.: US 8,879,082 B2
(45) Date of Patent: Nov. 4, 2014

(54) IMAGE READING APPARATUS AND IMAGE FORMING APPARATUS

(71) Applicant: KYOCERA Document Solutions Inc., Osaka (JP)

(72) Inventor: Hideto Hiyanagi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 23 days.

(21) Appl. No.: 13/681,995

(22) Filed: Nov. 20, 2012

(65) Prior Publication Data

US 2013/0135647 A1   May 30, 2013

(30) Foreign Application Priority Data

Nov. 29, 2011   (JP) .................................. 2011-260540

(51) Int. Cl.
| | |
|---|---|
| *G06K 1/00* | (2006.01) |
| *H04N 1/04* | (2006.01) |
| *H04N 1/10* | (2006.01) |
| *G06K 15/02* | (2006.01) |
| *H04N 1/00* | (2006.01) |

(52) U.S. Cl.
CPC ........ *G06K 15/02* (2013.01); *H04N 2201/0091* (2013.01); *H04N 1/00522* (2013.01); *H04N 1/103* (2013.01); *H04N 1/00* (2013.01); *H04N 1/1052* (2013.01); *H04N 1/00527* (2013.01); *H04N 1/1026* (2013.01)
USPC ........... 358/1.13; 358/1.6; 358/474; 358/497; 358/498

(58) Field of Classification Search
CPC . H04N 1/107; H04N 10/1017; H04N 1/1021; H04N 1/1026; H04N 1/1043; H04N 1/1048; H04N 1/1052; H04N 1/1077
See application file for complete search history.

(56) References Cited

U.S. PATENT DOCUMENTS

2007/0109562 A1* 5/2007 Nagatani ........................ 358/1.6

FOREIGN PATENT DOCUMENTS

| JP | 2007-271826 | 10/2007 |
|---|---|---|
| JP | 2007-292973 | 11/2007 |

OTHER PUBLICATIONS

Machine translation of JP Pub 2007-271826 to Funaki et al.*

* cited by examiner

*Primary Examiner* — Fan Zhang
*Assistant Examiner* — Haris Sabah
(74) *Attorney, Agent, or Firm* — Gerald E. Hespos; Michael J. Porco; Matthew T. Hespos (57) ABSTRACT

An image reading apparatus includes an original document platform, a reflection carriage, a wire, a pulley, a slide member, a projecting section and a guide section. The reflection carriage includes a mirror for reflecting light, and is moved in a first direction along a sub-scanning direction with respect to the original document. The wire is wound around a pulley. The slide member is installed on the reflection carriage, rotatably supports the pulley, and slidably moves in the first direction with respect to the reflection carriage. The projecting section is provided to project in a second direction that intersects with the first direction, on one of the reflection carriage and the slide member. The guide section is provided to extend in the first direction on the other of the reflection carriage and the slide member. The projecting section abuts against the guide section.

8 Claims, 9 Drawing Sheets

IMAGE READING APPARATUS AND IMAGE FORMING APPARATUS

This application is based on Japanese Patent Application No. 2011-260540 submitted to the Japanese Patent Office on Nov. 29, 2011, the contents of which are incorporated herein by reference.

BACKGROUND

The present disclosure relates to an image reading apparatus and an image forming apparatus.

The following disclosure is known in relation to an image reading apparatus which reads in an image from an original document and outputs image data in accordance with the image. In a disclosure of this kind, the image reading apparatus includes a platen glass, a first carriage and a second carriage. An original document is placed on an upper surface of the platen glass. The first carriage includes a light source which irradiates light onto the original document placed on the platen glass and a first mirror which reflects image light reflected by the original document. The second carriage includes a second mirror which reflects light reflected from the first mirror, and a third mirror which further reflects the light reflected from the second mirror. The first carriage and the second carriage are movable in a sub-scanning direction which is perpendicular to a main scanning direction, which is a scanning direction of the image light.

A pair of wires for moving the first and second carriages in the sub-scanning direction are installed about the respective end sections of the first and second carriages in the main scanning direction. Pulleys around which the wires are wound are arranged on the first and second carriages.

In a disclosure such as that described above, if the positions of the pair of pulleys deviate in the sub-scanning direction, then the lengths of the pair of wires which move the carriages are not equal between the respective ends. Therefore, the mirror which is arranged on the carriage is arranged in an inclined fashion with respect to the main scanning direction. As a result of this, skewing and magnification problems occur in the read image. Therefore, in the prior art disclosure described above, a supporting member which movably supports the pulley with respect to the carriage is provided. By moving this supporting member with respect to the carriage, the position of the pulley is adjusted in the sub-scanning direction and the length of the wire is adjusted.

However, the wires are tensioned around the pulleys in two mutually opposing directions in the sub-scanning direction. The wires tensioned in these two directions are respectively wound around the outer circumferences of pulleys at a prescribed interval apart in the axial direction of the pulleys. Therefore, an external force acts on the pulleys so as to cause the rotational axis to incline from the main scanning direction. If an external force of this kind acts on the pulley, then it is difficult to move the supporting member in the sub-scanning direction with respect to the carriage, in order to adjust the position of the pulley. Furthermore, the slidability of the supporting member with respect to the carriage is impaired by the external force described above, and fine adjustment of the position of the pulley is difficult to achieve.

The present disclosure was devised in view of the problems described above, an object thereof being to improve the accuracy of positional adjustment of a pulley provided on a carriage which supports a mirror.

SUMMARY

The image reading apparatus relating to one aspect of the present disclosure includes an original document platform having an upper surface on which an original document is placed, a frame which supports the original document platform, a reflection carriage, a drive unit, a wire, a pulley, a slide member, a projecting section and a guide section.

The reflection carriage is arranged inside the frame, includes a mirror for reflecting light reflected from the original document, and is moved in a first direction along a sub-scanning direction with respect to the original document. The drive unit moves the reflection carriage in the first direction. The wire receives the drive force from the drive unit and moves the reflection carriage in the first direction. The wire is wound around the pulley. The slide member is installed on the reflection carriage, rotatably supports the pulley, and slidably moves in the first direction with respect to the reflection carriage. The projecting section is provided to project in a second direction that intersects with the first direction in a plane in which the reflection carriage moves, on one of the reflection carriage and the slide member. The guide section is provided to extend in the first direction on the other of the reflection carriage and the slide member, on which the projecting section is not provided. The projecting section abuts against the guide section.

DETAILED DESCRIPTION

Below, one embodiment of the present disclosure is described with reference to the drawings. An image forming apparatus 1 includes a main frame 2. The main frame 2 includes a lower frame 21, an upper frame 22 which is arranged above the lower frame 21, and a coupling frame 23 which couples together the lower frame 21 and the upper frame 22. The coupling frame 23 extends towards a right edge and a rear edge of the frame body 2. A sheet on which a printing process has been carried out is output into an output space 24.

An operating unit 221 which projects in the front surface direction of the upper frame 22 includes an LCD touch panel 222, for example.

The upper frame 22 accommodates an image reading apparatus 5. The image reading apparatus 5 includes a contact glass 225 which is installed on an upper surface of the upper frame 22. An original document cover 3 arranged on the upper frame 22 is used in order to press down an original document. A user rotates the original document cover 3 upwards by pivoting about a rear end of the original document cover 3, and places an original document on the contact glass 225. When the user operates the image forming apparatus 1 via the operating unit 221, the image reading apparatus 5 reads in an image of the original document on the contact glass 225 by performing a scanning action over same.

A sheet tray 250 on which a plurality of sheets are stacked is arranged in the lower frame 21. A sheet P accommodated in the sheet tray 250 is conveyed out upwards inside the lower frame 21, undergoes an image forming process inside the lower frame 21 and is output into the output space 24.

Figure 1:
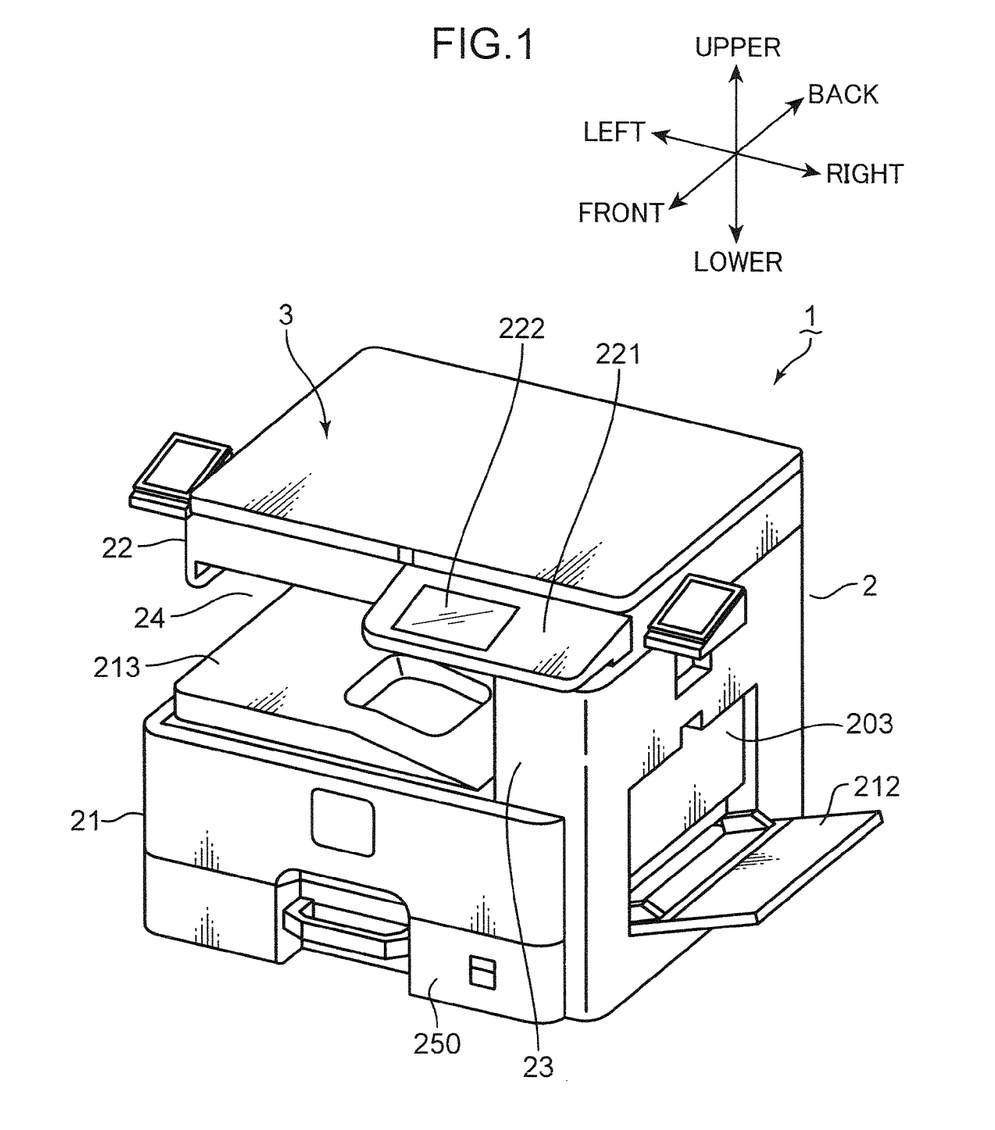
FIG. 1 is a perspective diagram of an image forming apparatus according to an embodiment of the present disclosure.

If the tray 212 is situated in a position projected to the right of the lower frame 21, as shown in FIG. 1, then the user is able to place sheets in the tray 212. In accordance with a printing instruction, a sheet in the tray 212 is taken inside the lower frame 21, undergoes an image forming process, and is then output into the output space 24. When the tray 212 is rotated upwards, the tray 212 is accommodated inside an accommodating space 203 which is provided in a recessed form in a right surface of the lower frame 21, and a supply opening for taking sheets inside the lower frame 21 is closed off.

The lower frame 21 accommodates various devices for forming an image on a sheet. Furthermore, the coupling frame 23 accommodates various devices for outputting a sheet which has undergone an image forming process, into the output space 24.

Figure 2:
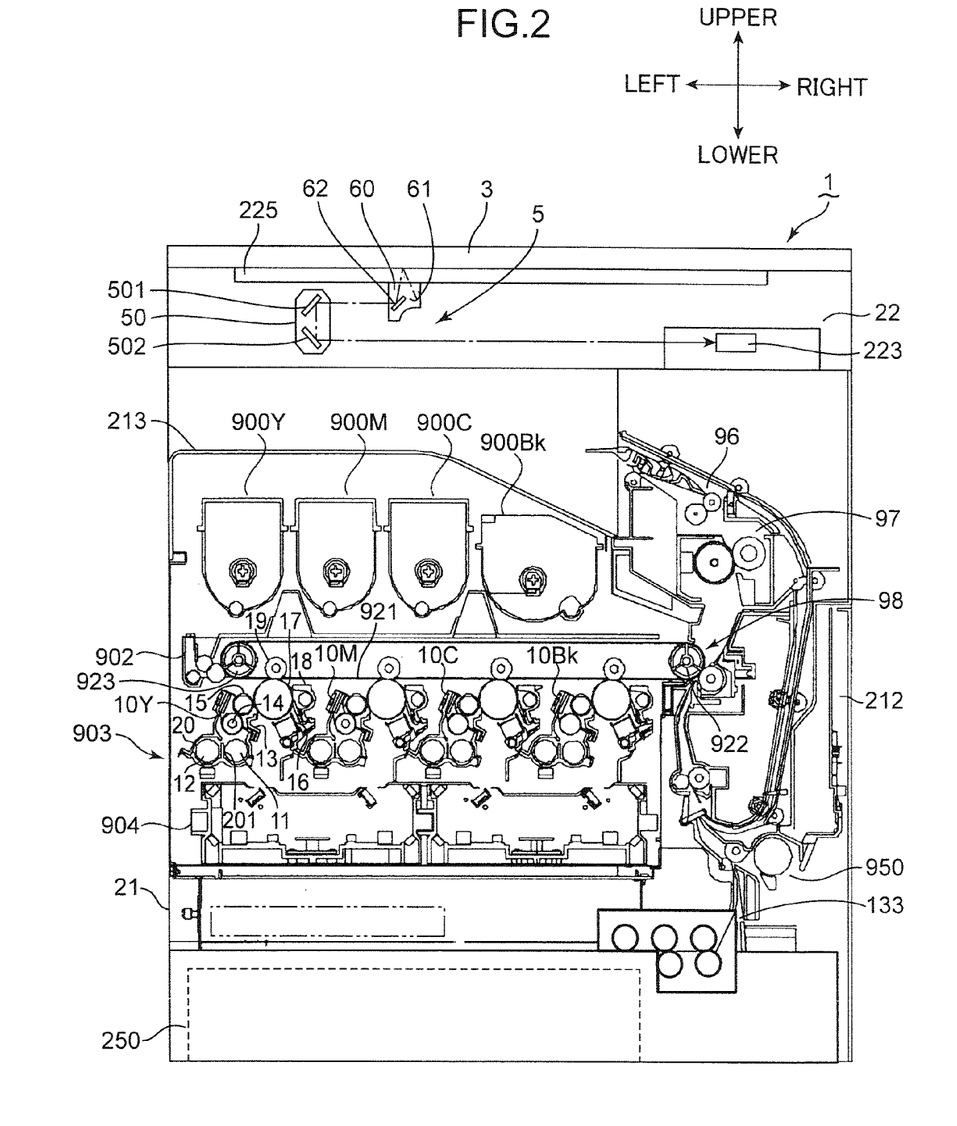
FIG. 2 is an internal cross-sectional diagram of an image forming apparatus according to the embodiment of the present disclosure.

Accommodated in the lower frame 21 are: toner containers 900Y, 900M, 900C, 900Bk, an intermediate transfer unit 902, an image forming unit 903, an exposure unit 904, a fixing unit 97 and a paper output unit 96.

The image forming unit 903 includes the yellow toner container 900Y, the magenta toner container 900M, the cyan toner container 900C and the black toner container 900Bk. Developing apparatuses 10Y, 10M, 10C and 10Bk corresponding to the respective colors of Y, M, C, Bk, are arranged respectively below each of the containers.

The image forming unit 903 includes photosensitive drums 17 which carry toner images of the respective colors.

A charger 16, a developing apparatus 10 (10Y, 10M, 10C, 10Bk), a transfer device 19 and a cleaning apparatus 18 are arranged about each photosensitive drum 17. A surface of the photosensitive drum 17 after charging is exposed by the exposure unit 904, thereby forming an electrostatic latent image. The exposure unit 904 irradiates laser light onto the surface of the photosensitive drum 17. The developing apparatuses 10Y, 10M, 10C and 10Bk develop (convert into a visible image) the electrostatic latent images formed on the respective photosensitive drums 17 by using toners of respective colors which are supplied respectively from the toner containers 900Y, 900M, 900C and 900Bk. Transfer rollers 19 form respective nip sections with the photosensitive drums 17 by sandwiching an intermediate transfer belt 921, and primarily transfer the toner images on the photosensitive drums 17 onto the intermediate transfer belt 921. The cleaning apparatus 18 cleans the circumferential surfaces of the photosensitive drums 17 after transfer of the toner images.

The developing apparatuses 10Y, 10M, 10C and 10Bk each include a developing housing 20. Furthermore, two churning rollers 11 and 12 are arranged rotatably in parallel inside the developing housing 20, with an axial direction of the rollers aligned with a lengthwise direction of the developing housing 20 in the vicinity of a bottom part of the developing housing 20.

A developer circulation path is provided on an inner bottom surface of the developing housing 20, and the churning rollers 11 and 12 are arranged inside this developer circulation path. A partition wall 201 erected from the bottom part of the developing housing 20 is provided in the axial direction between the churning rollers 11 and 12. The circulation path is formed so as to revolve about the circumference of the partition wall 201. A two-component developer on the churning roller 11 is attracted onto and conveyed on a magnetic roller 14 which is positioned to the upper side. A layer height of the magnetic brush on the magnetic roller 14 is restricted by a doctor blade 13, and the magnetic brush supplies toner to a developing roller 15 which is situated further thereabove.

The exposure unit 904 then forms an electrostatic latent image by irradiating light on the basis of the image data.

The intermediate transfer unit 902 includes an intermediate transfer belt 921, a driver roller 922 and an idle roller 923. Toner images are respectively superimposed onto the intermediate transfer belt 921 from the plurality of photosensitive drums 17 (primary transfer). The superimposed toner images are secondarily transferred by a secondary transfer unit 98 onto a sheet which is supplied from the sheet tray 250 or the tray 212 (see FIG. 1). The drive roller 922 and the idle roller 923 which drive the intermediate transfer belt 921 to revolve are supported rotatably by the lower frame 21.

The fixing unit 97 applies a fixing process to the toner image on the sheet which has been secondarily transferred from the intermediate transfer unit 902. The sheet bearing a color image which has undergone a fixing process is output towards the paper output unit 96 which is formed in an upper part of the fixing unit (inside the coupling frame 23).

<Image Reading Apparatus 5>

Figure 3:
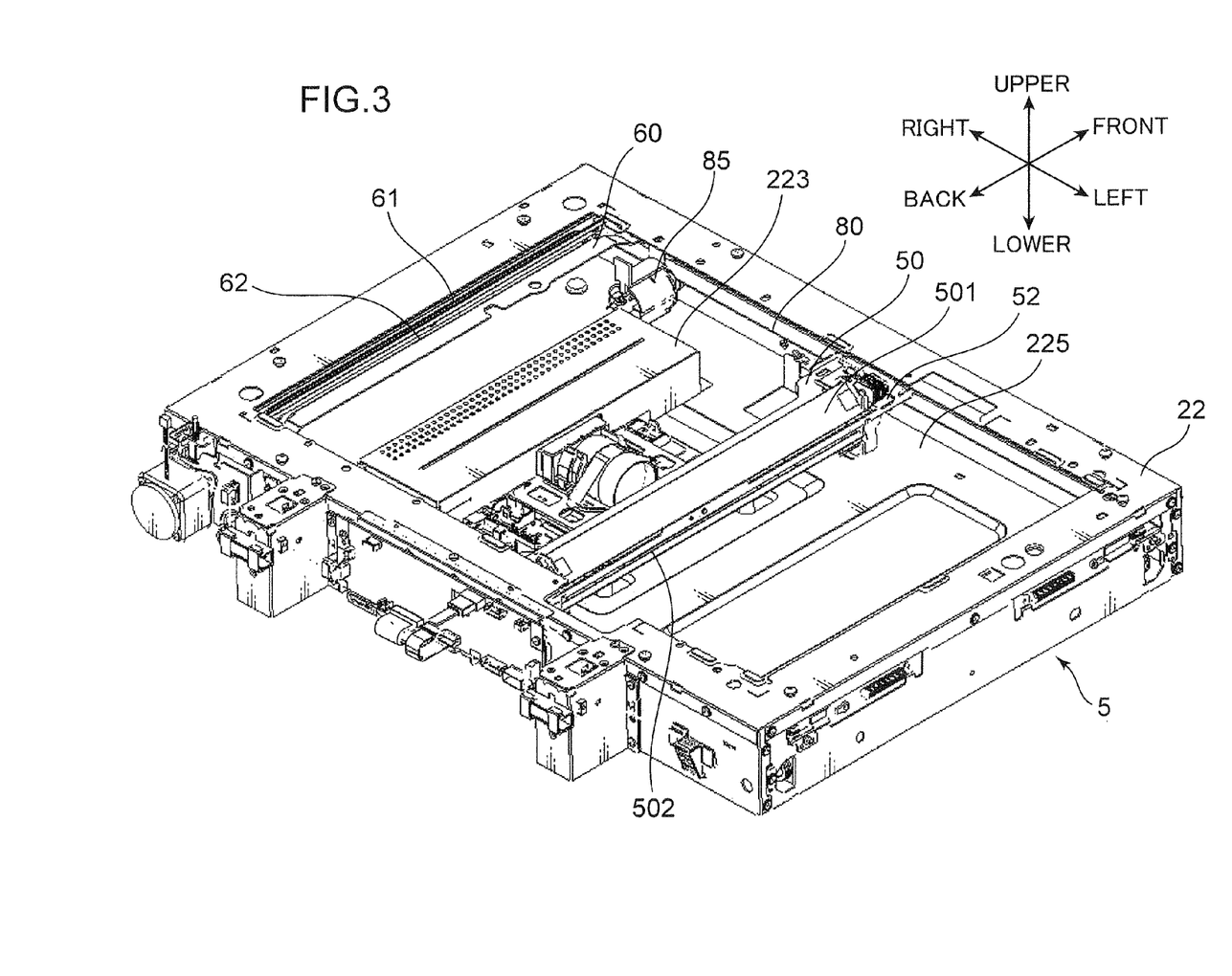
FIG. 3 is an upward perspective diagram of an image reading apparatus according to the embodiment of the present disclosure.

The description now continues with reference to FIG. 2 and FIG. 3.

The image reading apparatus 5 includes the contact glass 225 described above, and a first carriage 60, a second carriage 50 and a light receiving unit 223. The contact glass 225 is supported by the upper frame 22.

The first carriage 60 (projection carriage) is arranged inside the upper frame 22, and is a plate-shaped unit which extends in the front/rear direction of the image reading apparatus 5. The first carriage 60 includes a light source 61 and a first mirror 62. The light source 61 irradiates light onto an original document on the contact glass 225. The first mirror 62 reflects the light reflected from the original document, in the leftward direction in FIG. 2.

The second carriage 50 (reflection carriage) is arranged inside the upper frame 22, and is a plate-shaped unit which extends in the front/rear direction of the image reading apparatus 5, in parallel with the first carriage 60. The second carriage 50 includes a second mirror 501 and a third mirror 502. The second mirror 501 is arranged above the second carriage 50 and reflects the light that has been reflected by the first mirror 62, in a downward direction. The third mirror 502 is arranged below the second carriage 50 and further reflects the light that has been reflected by the second mirror 501, in a rightward direction.

The light receiving unit 223 is arranged on the right-hand side inside the upper frame 22, and receives the reflected light that has been reflected by the third mirror 502.

The image reading apparatus 5 also includes wires 80 and a motor 85 (drive unit) (FIG. 3). A pair of the wires 80 are arranged at either end in the front/rear direction of the image reading apparatus 5. The pair of wires 80 are installed so as to extend in the left/right direction inside the upper frame 22, and each receives drive force from the motor 85. The wires 80 are each wound around idle pulleys 55 (described hereinafter), which are arranged in the first carriage 60 and the second carriage 50. By rotating the motor 85, the wires 80 cause the first carriage 60 and the second carriage 50 to move in the left/right direction via the idle pulleys 55.

Therefore, the first carriage 60 and the second carriage 50 are moved by the wires 80 so as to perform a scanning action in the left/right direction (a sub-scanning direction; a first direction) over an original document image which is placed on the contact glass 225, while performing a scanning action in the front/rear direction (a main scanning direction) over the original document image. Consequently, it is possible to perform a two-dimensional scanning action over the original document image.

Figure 9:
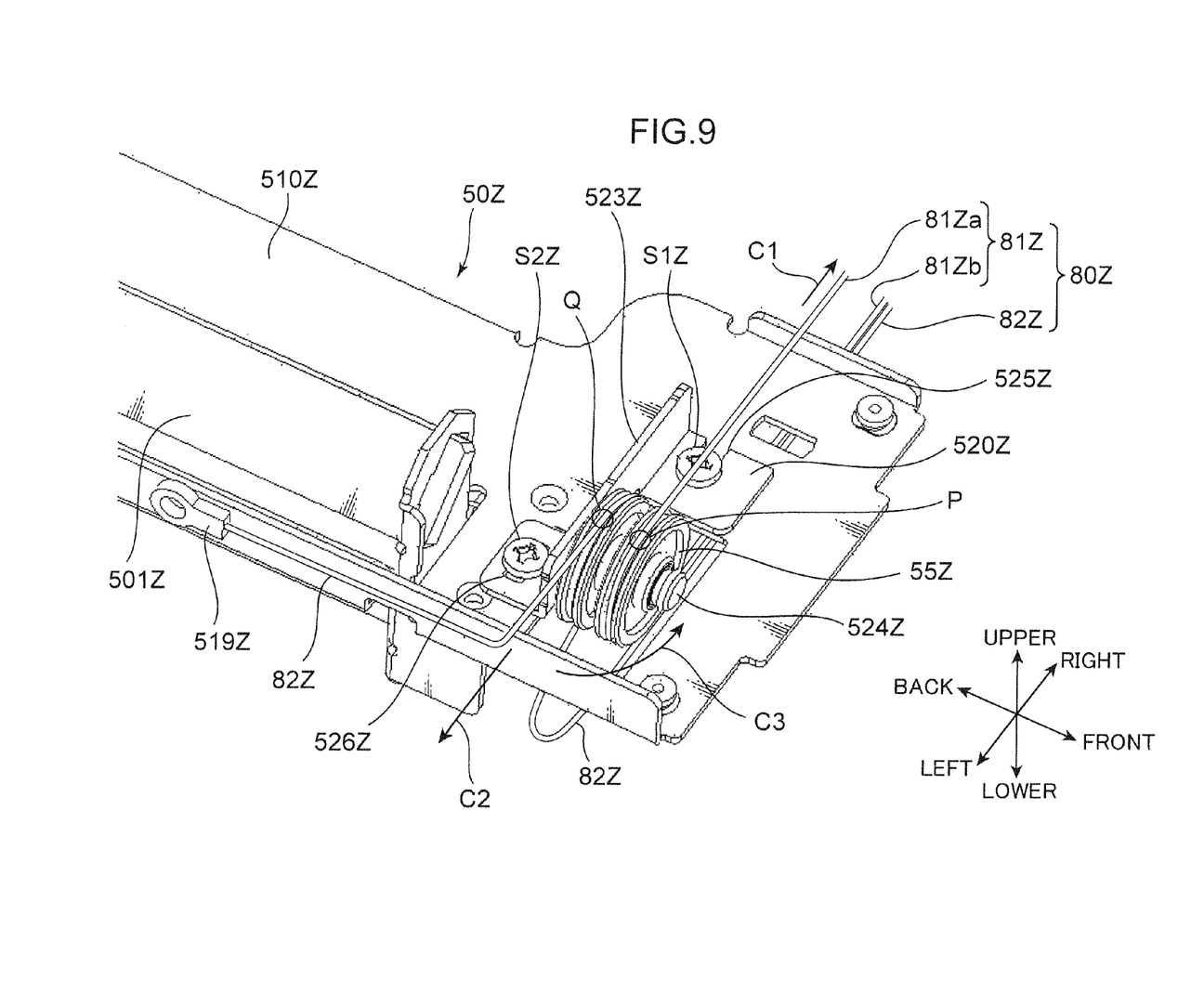
FIG. 9 is an enlarged perspective diagram of the reflection carriage.

Next, problems relating to the installation of the wires inside the upper frame 22 in the composition of an image reading apparatus 5 such as that described above will be explained in detail. FIG. 9 is an enlarged perspective diagram of a second carriage 50Z. FIG. 9 shows an enlarged view of a front side end portion of the second carriage 50Z.

The second carriage 50Z includes a main plate 510Z. The main plate 510Z is a plate-shaped member extending in the front/rear direction, and a second mirror 501Z is arranged in an upper part thereof. Furthermore, a second carriage 50Z includes a supporting plate 520Z and an idle pulley 55Z.

The supporting plate 520Z is arranged on the main plate 510Z, to the forward side of the second mirror 501Z. The supporting plate 520Z is fastened to the main plate 510Z by screws S1Z and S2Z. The supporting plate 520Z includes an upright wall 523Z which is erected in an upward direction.

The idle pulley 55Z is supported rotatably on a shaft 524Z which extends towards the front direction from the upright wall 523Z. The idle pulley 55Z includes outer circumference sections P and Q at two locations in the front/rear direction, and a portion of a wire 80Z is wound respectively around these outer circumference sections P and Q.

Below, the description of the installation of the wire 80Z is divided between a first portion 81Z and a second portion 82Z in FIG. 9. The first portion 81Za of the wire 80Z which is installed towards the idle pulley 55Z from the rightward direction is wound around the front side outer circumference section P of the idle pulley 55Z, and is then installed again towards the rightward direction (81Zb). On the other hand, one end of the second portion 82Z of the wire 80Z is fixed to a wire fixing section 519Z which is arranged on a left surface of the main plate 510Z. The other end of the second portion 82Z is wound around the rear side outer circumference section Q of the idle pulley 55Z and is passed below the second carriage 50 and installed in the rightward direction. In FIG. 9, the one end (81Za) of the first portion 81Z and the other end of the second portion 82Z, in the wire 80Z which is directed in the rightward direction, is wound around a pulley (not illustrated) which is coupled to the motor 85. Furthermore, the other end (81Zb) of the first portion 81Z is fixed to a fixed end section (not illustrated) which is arranged in the vicinity of the motor 85 in the upper frame 22.

A composition similar to that described above is also arranged in the rear side end portion of the second carriage 50Z. Traction is imparted to the wire 80Z by the rotational drive force of the motor 85, whereby the second carriage 50Z is moved in the left/right direction (the sub-scanning direction). In this, if the length of the wire 80Z between the outer circumference section P of the idle pulley 55Z and the fixed end section (not illustrated) which is arranged in the upper frame 22 is different between two locations at the front and the rear of the second carriage 50Z, then the second carriage 50Z is arranged at an inclination of a prescribed angle in the left/right direction. As a result of this, the second mirror 501Z which reflects the reflected light is inclined in the left/right direction and problems occurs in relation to skewing and magnification of the read image.

Therefore, the supporting plate 520Z is provided slidably in the left/right direction with respect to the main plate 510Z. The supporting plate 520Z moves along a first elongated hole 525Z and a second elongated hole 526Z which are formed in the supporting plate 520Z. By this means, the fixing position of the supporting plate 520Z on the main plate 510Z can be adjusted. The supporting plate 520Z provided with the idle pulley 55Z is fixed to the main plate 510Z in such a manner that the lengths of the wire 80Z are equal in the two locations at the front and the rear of the second carriage 50Z.

However, in the adjustment process described above, problems such as the following occur. As stated previously, a first portion 81Z is wound around the outer circumference section P of the idle pulley 55Z in FIG. 9. Therefore, a tension acts in the direction of arrow C1 on the outer circumference section P. Furthermore, the second portion 82Z is wound around the outer circumference section Q of the idle pulley 55Z. Therefore, a tension acts in the direction of arrow C2 on the outer circumference section Q. As a result of this, a rotational force is imparted to the idle pulley 55Z in the direction of arrow C3. In this state, if the position of the idle pulley 55Z has been adjusted and the supporting plate 520Z has been moved along the first elongated hole 525Z and the second elongated hole 526Z, then the supporting plate 520Z is unfortunately moved by a prescribed angle in the left/right direction towards the direction of inclination. In this case, the screws S1Z and S2Z and the first elongated hole 525Z and the second elongated hole 526Z of the supporting plate 520Z interfere with each other, and it is difficult to adjust the position of the supporting plate 520Z precisely. In addition to this, a large amount of time is taken up with positional adjustment of the supporting plate 520Z. Furthermore, if the screws S1Z and S2Z are fastened while the rotational force is applied to the supporting plate 520Z, then the idle pulley 55Z may be fixed at an inclination in the left/right direction.

Figure 4:
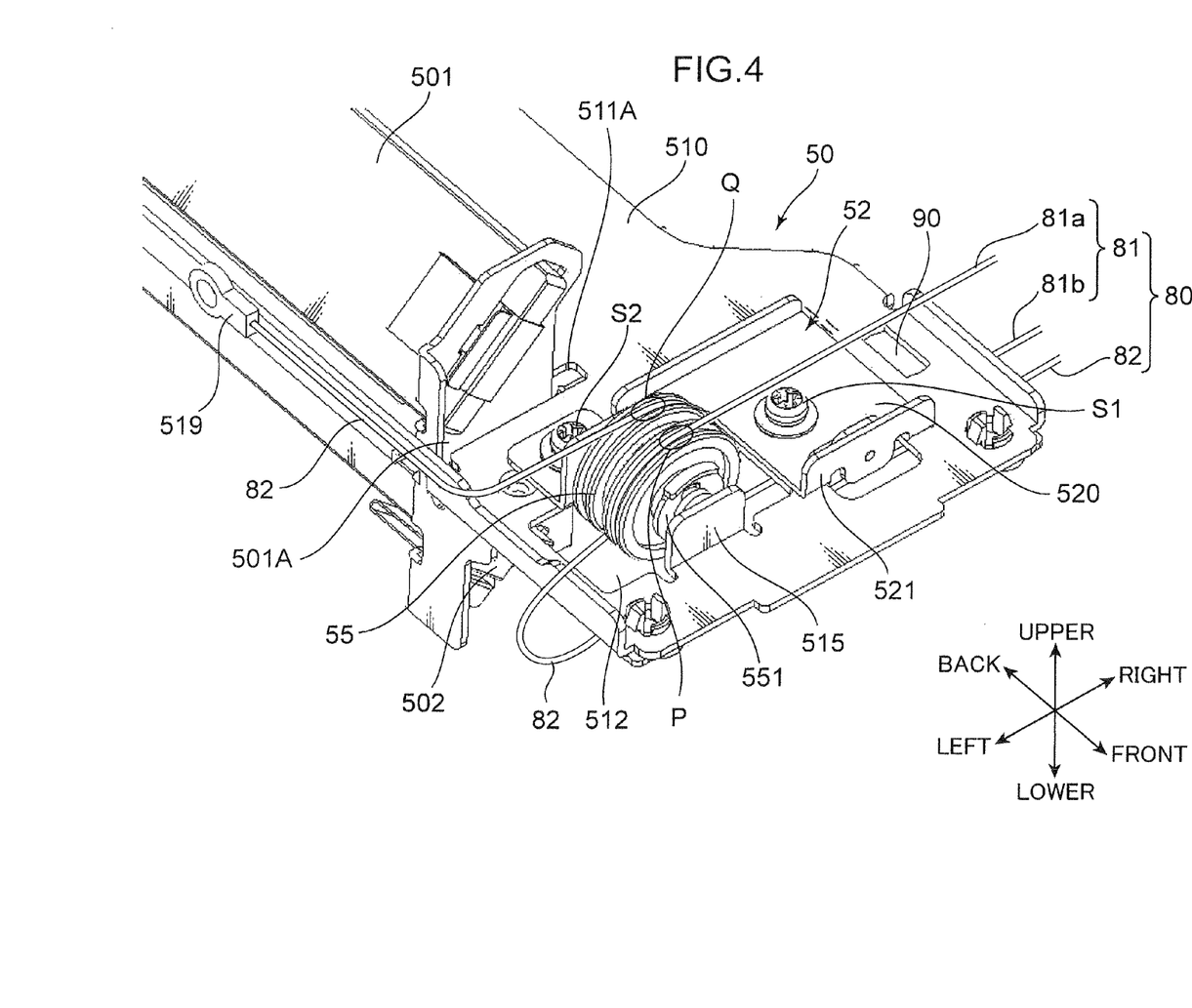
FIG. 4 is an enlarged perspective diagram of a reflection carriage according to the embodiment of the present disclosure.
Figure 5:
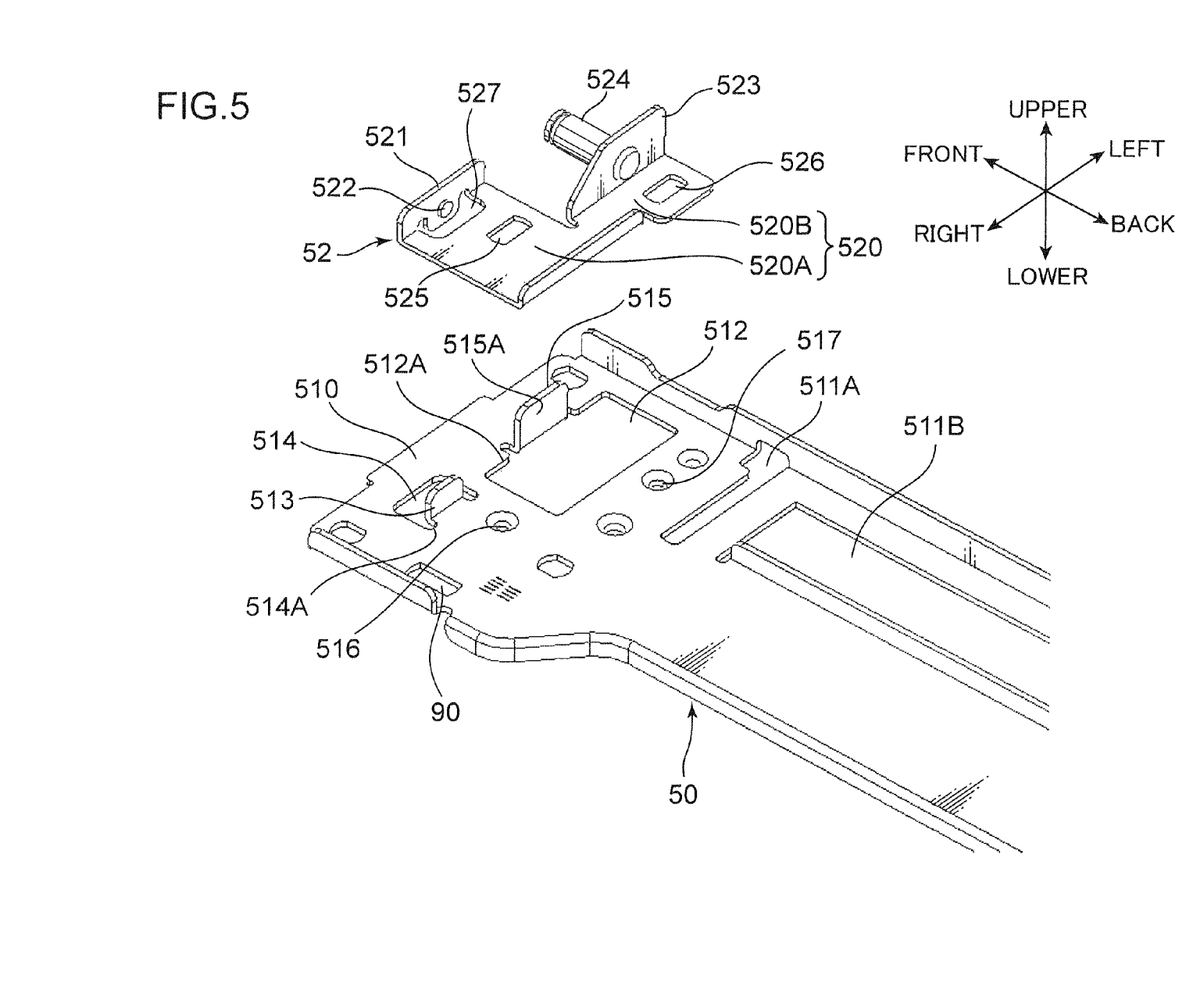
FIG. 5 is an exploded perspective diagram of a reflection carriage according to the embodiment of the present disclosure.
Figure 6:
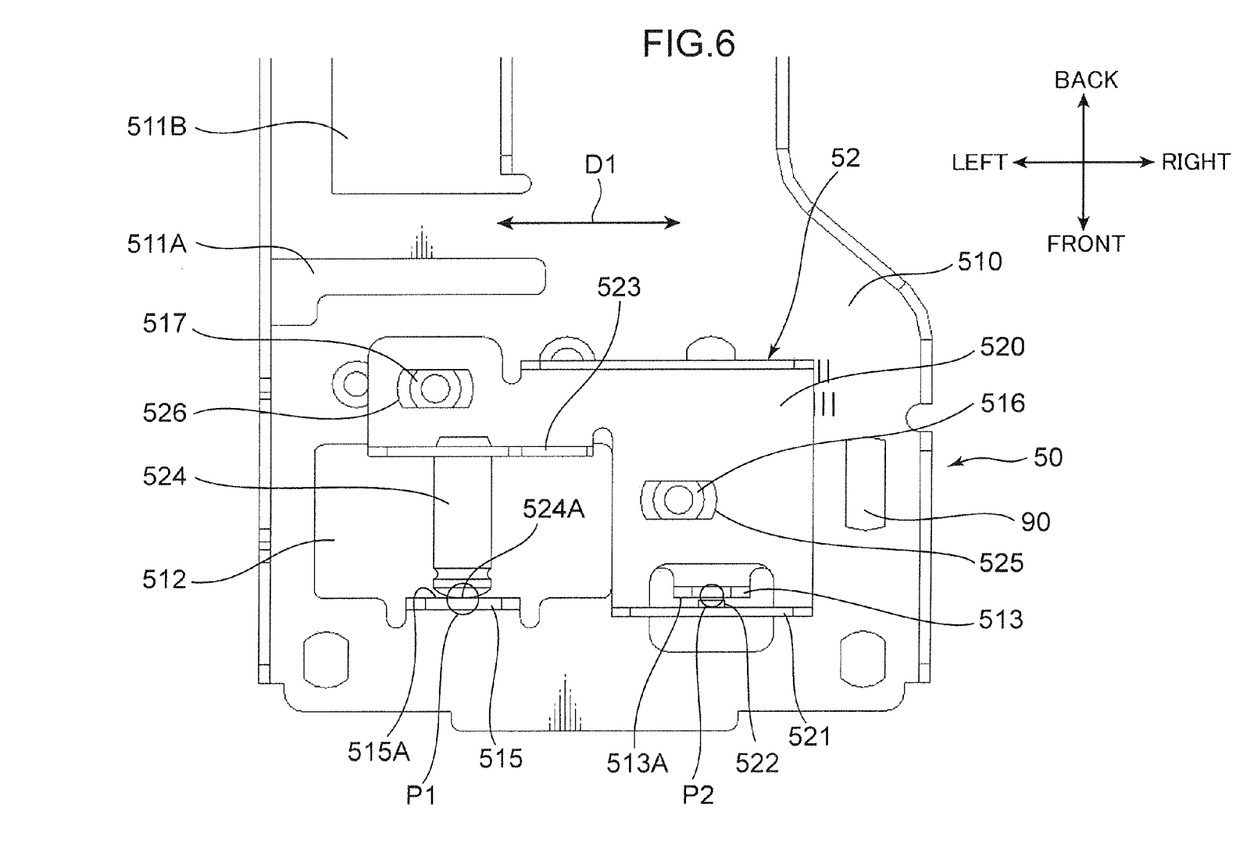
FIG. 6 is an enlarged upper surface diagram of a reflection carriage according to the embodiment of the present disclosure.
Figure 7:
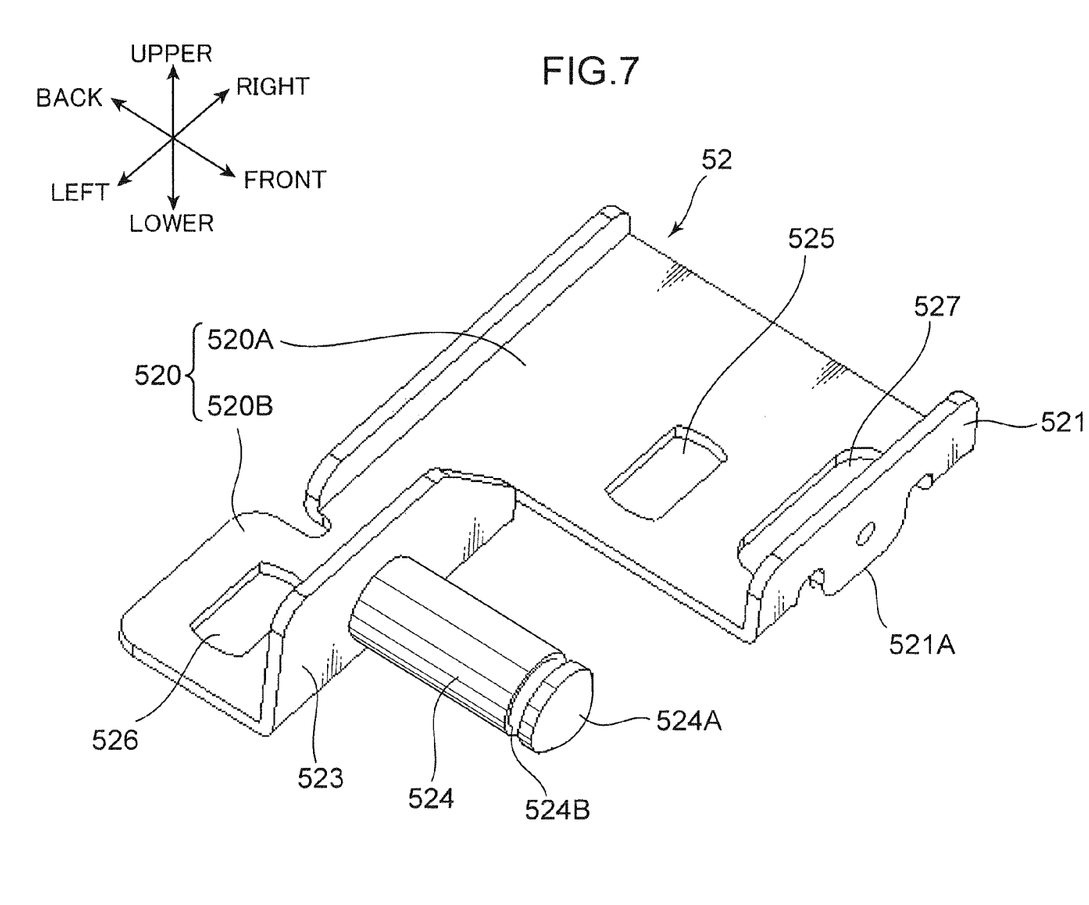
FIG. 7 is a perspective diagram of a slide member according to the embodiment of the present disclosure.
Figure 8:
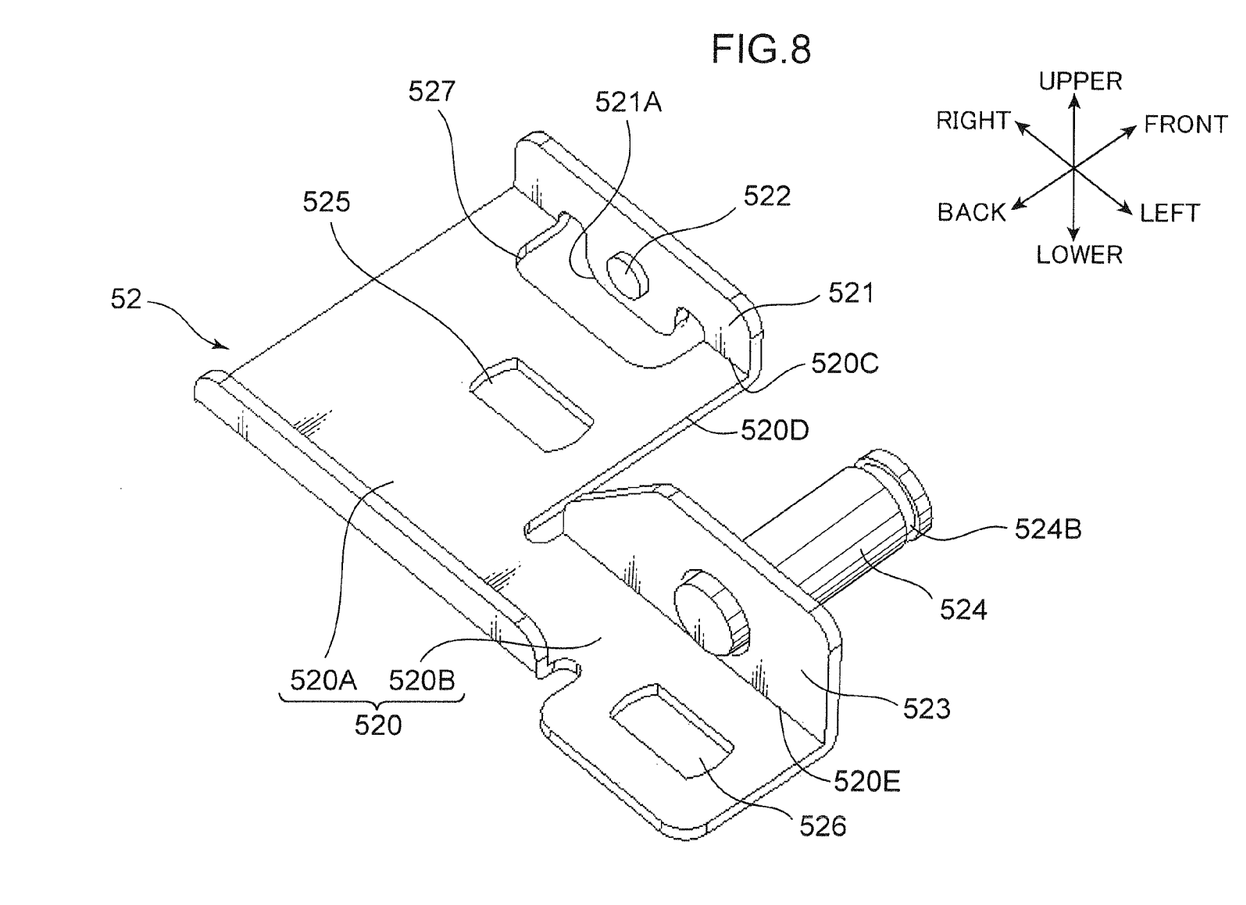
FIG. 8 is a perspective diagram of a slide member according to the embodiment of the present disclosure.

In order to resolve problems such as those described above, in the present embodiment, a slide member 52 capable of performing a smooth sliding movement in the left/right direction is provided. Next, a second carriage 50 which includes a slide member 52 relating to the present embodiment will be described in detail. FIG. 4 is an enlarged perspective diagram of the second carriage 50 relating to the present embodiment and FIG. 5 is an exploded perspective diagram of the second carriage 50 relating to the present embodiment. Furthermore, FIG. 6 is an enlarged upper surface diagram of a second carriage 50 relating to the present embodiment. Moreover, FIG. 7 and FIG. 8 are perspective diagrams of a slide member 52 relating to the present embodiment.

Referring to FIG. 4 and FIG. 5, the second carriage 50 includes a main plate 510, a slide member 52, a second mirror 501, a third mirror 502, a supporting member 501A and an idle pulley 55.

The main plate 510 is a base component which demarcates the second carriage 50, and is a plate-shape member which extends in the front/rear direction. The main plate 510 includes a pair of supporting opening sections 511A, a mirror opening section 511B and a jig hole 90 (FIG. 5). Furthermore, the main plate 510 includes a second wall section 513, a first opening section 514, a pulley opening section 512, a first wall section 515, a first fastening hole 516 and a second fastening hole 517.

The pair of supporting members 501A (FIG. 4) support the second mirror 501 and the third mirror 502 respectively at either end portion thereof in the front/rear direction.

The supporting opening section 511A is a long narrow rectangular opening which is formed in a front side of the main plate 510, and a supporting member 501A is inserted therein as shown in FIG. 4. A pair of the supporting opening sections 511A are formed at the front and rear of the main plate 510.

The mirror opening section 511B is an opening which extends in the central portion of the lengthwise direction (front/rear direction) of the main plate 510, and is positioned between the second mirror 501 and the third mirror 502 in the up/down direction. The mirror opening section 511B guides the reflected light which has been reflected by the second mirror 501 to a third mirror 502.

The jig hole 90 is an elongated hole-shaped opening which is formed in the right end portion of the front side end of the main plate 510. When positional adjustment of the idle pulley 55 is carried out as described below, a jig pin (not illustrated) is inserted into the jig hole 90 thereby fixing the second carriage 50. A jig hole 90 is also arranged similarly in the rear side end portion of the main plate 510 (not illustrated).

The pulley opening section 512 is an opening which is formed into a rectangular shape on the front side end portion of the main plate 510. The pulley opening section 512 is arranged to the outer side, in the front/rear direction, of the second mirror 501 which is arranged in the mirror opening section 511B. A portion of the rotating circumferential surface of the idle pulley 55 supported by the slide member 52 is accommodated in the pulley opening section 512 (see FIG. 4).

The first wall section 515 is a wall section which is erected in an upward direction from an end edge 512A, which is one edge on the front side of the pulley opening section 512. In FIG. 5, the first wall section 515 includes a first abutting surface 515A (guide section) which extends in a first direction.

The first opening section 514 is a rectangular opening which is formed to the right-hand side of the pulley opening section 512 of the main plate 510. The first opening section 514 has an opening of a smaller surface area than the pulley opening section 512. A lower end section 521A (FIG. 7) of a third wall section 521 of the slide member 52 is inserted into the first opening section 514.

The second wall section 513 is a wall section which is erected in an upward direction from an end edge 514A, which is one edge on the rear side of the first opening section 514. The second wall section 513 includes a second abutting surface 513A (auxiliary guide section) which extends in the first direction (see FIG. 6).

The first fastening hole 516 and the second fastening hole 517 are screw holes which are respectively formed to the right side and the rear side of the pulley opening section 512 of the main plate 510. Screws S1 and S2 which fix the slide member to the reflecting carriage 50 are fastened into the first fastening hole 516 and the second fastening hole 517.

Referring to FIG. 7 and FIG. 8, the slide member 52 includes a supporting plate 520. The supporting plate 520 is a base component which demarcates the slide member 52, and includes a first plate section 520A and a second plate section 520B. The first plate section 520A is a substantially square-shaped plate-shaped portion in planar view. The first plate section 520A includes a second opening section 527, a third wall section 521 and a first elongated hole 525.

The second opening section 527 is an opening which is formed in the first plate section 520A along the one edge 520C on the front side of the first plate section 520A. The second wall section 513 of the main plate 510 is inserted into the second opening section 527 (FIG. 5).

The third wall section 521 is a wall section which is erected in an upward direction from the one edge 520C on the front side of the first plate section 520A. A projecting section 522 (auxiliary projecting section) is arranged on a rear side surface of the third wall section 521. The projecting section 522 is provided to project in a round bar shape with a small height, in a direction (a second direction) which intersects with the first direction, namely, the rear direction, in the plane in which the second carriage 50 moves. Furthermore, on the lower end of the third wall section 521, the lower end central section 521A projects downwards so as to pass through the second opening section 527.

The first elongated hole 525 is an elongated hole-shaped opening which is formed extending in the left/right direction in substantially a central portion of the first plate section 520A. When fixing the slide member 52 to the main plate 510 by screws, a screw is inserted into the first elongated hole 525. In this case, the first elongated hole 525 is arranged so as to overlap with the first fastening hole 516 (FIG. 5).

The second plate section 520B is an oblong plate-shaped portion which is disposed so as to extend in the leftward direction from the rear side portion of one edge 520D on the left side of the first plate section 520A. The second plate section 520B includes a fourth wall section 523, a pulley shaft 524 (axle section) and a second elongated hole 526.

The fourth wall section 523 is a wall section which is erected in an upward direction from one edge 520E on the front side of the second plate section 520B. The pulley shaft 524 is a round bar member which is provided to project in a second direction, in other words, a forward direction, from a side surface of the fourth wall section 523. The pulley shaft 524 is a rotational axis for the rotation of the idle pulley 55. A front end section 524A (projecting section) is formed on a front end of the pulley shaft 524. The front end section 524A is processed into a hemispherical shape by applying a machining process to the front end of the pulley shaft 524. Furthermore, a groove section 524B which is formed in the outer circumference of the pulley shaft 524 is disposed on the inner side of the front end section 524A of the pulley shaft 524. An e crip for fixing the idle pulley 55 to the pulley shaft 524 is installed in the groove section 524B.

The second elongated hole 526 is an elongated hole-shaped opening which is formed extending in the left/right direction in substantially a central portion of the second plate section 520B. When fixing the slide member 52 to the main plate 510 by screws, a screw is inserted into the second elongated hole 526. In this case, the second elongated hole 526 is arranged so as to overlap with the second fastening hole 517 (FIG. 5).

The idle pulley 55 (FIG. 4) is supported rotatably on the pulley shaft 524. Drive force which moves the second carriage 50 in the left/right direction is transmitted from the wire 80 to the idle pulley 55.

Next, a procedure for installing the slide member 52 on the main plate 510 is described with reference to FIG. 4 to FIG. 6. When the idle pulley 55 is inserted into the pulley shaft 524 of the slide member 52, the e clip is installed in the groove section 524B. Therefore, the idle pulley 55 is supported rotatably on the supporting plate 520.

As shown in FIG. 5, the supporting plate 520 which supports the idle pulley 55 is installed on the main plate 510 from above (see FIG. 5; the idle pulley 55 is not illustrated). In this, as stated previously, the slide member 52 is arranged on the main plate 510 in such a manner that the first elongated hole 525 overlaps with the first fastening hole 516, and the second elongated hole 526 overlaps with the second fastening hole 517 (FIG. 6). The second wall section 513 of the main plate 510 is inserted into the second opening section 527 of the slide member 52. Furthermore, a lower end central section 521A (FIG. 7) of a third wall section 521 of the slide member 52 is inserted into the first opening section 514 of the main plate 510. Moreover, the lower end section of the rotating circumferential surface of the idle pulley 55 is inserted into the pulley opening section 512 of the main plate 510 (FIG. 4).

The first screw S1 which is inserted into the first elongated hole 525 and the second screw S2 which is inserted into the second elongated hole 526 are respectively fastened in the first fastening hole 516 and the second fastening hole 517. Therefore, the slide member 52 is fixed to the main plate 510 (FIG. 4). As a result of this, as shown in FIG. 6, the front end section 524A of the pulley shaft 524 abuts against the first abutting surface 515A of the first wall section 515, from the rear side to the front side in the second direction. Moreover, the projecting section 522 which is provided to project from the third wall section 521 of the slide member 52 abuts against the second abutting surface 513A of the second wall section 513 of the main plate 510, from the front side to the read side in the second direction.

Next, the action of the slide member 52 according to the present embodiment will be described. As stated previously, in order to adjust the position of the second mirror 501, the length of the wire 80 which is installed at two locations at the front and the rear of the second carriage 50 is adjusted. The adjustment of the length of the wire 80 is performed by sliding the slide member 52 which supports the idle pulley 55 in a left/right direction with respect to the main plate 510 which supports the second mirror 501. In FIG. 4, a jig pin (not illustrated) is inserted into the jig hole 90, and the second carriage 50 is fixed to the upper frame 22 (FIG. 3). The first screw S1 and the second screw S2 are then loosened in a state where the first portion 81 of the wire 80 is wound around the outer circumference section P and the second portion 82 of the wire 80 is wound around the outer circumference section Q. Consequently, the slide member 52 becomes movable in the direction of arrow D1, as shown in FIG. 6. However, a rotational force as indicated by arrow C3 in FIG. 9 is applied to the idle pulley 55. Therefore, an external force is applied to the slide member 52 in a direction that intersects with the direction of arrow D1 in FIG. 6.

In this way, even if an external force has been applied to the supporting plate 520, in the present embodiment, the front end section 524A (projecting section) of the pulley shaft 524 abuts against the first abutting surface 515A (guide section) of the first wall section 515 of the main plate 510. Therefore, in the sliding movement of the slide member 52, a guide function is provided in which the front end section 524A and the first wall section 515 guide the slide member 52 in the direction of the arrow D1 (the left/right direction). Consequently, the slidabililty between the slide member 52 and the main plate 510 is improved, and the sliding movement of the slide member 52 is performed smoothly. Moreover, a front end section 524A is formed on a pulley shaft 524 which serves as a rotational axis of the rotation of the idle pulley 55. Consequently, it is possible to form a projecting section having a guide function, by using the pulley shaft 524.

Furthermore, in the present embodiment, the front end section 524A is processed into a hemispherical shape by a machining process. Therefore, the front end section 524A makes a point contact with the first abutting surface 515A. Accordingly, the contact load produced in the contacting portion of the front end section 524A and the first abutting surface 515A is reduced.

Moreover, in the present embodiment, a projecting section 522 (auxiliary projecting section) which is provided to project from the third wall section 521 abuts against the second abutting surface 513A (auxiliary guide section) of the second wall section 513 of the main plate 510. Therefore, in the sliding movement of the slide member 52, a guide function is provided in which the projecting section 522 and the second wall section 513 guide the slide member 52 in the direction of the arrow D1 (the left/right direction). In this case, the sliding movement of the slide member 52 is guided at the two locations of the front end section 524A of the pulley shaft 524, and the projecting section 522. Therefore, the movement of the slide member 52 in the direction of the arrow D1 is performed more smoothly.

Moreover, in the present embodiment, the front end section 524A of the pulley shaft 524 abuts against the first abutting surface 515A from the rear side towards the front side, in the second direction. On the other hand, the projecting section 522 of the third wall section 521 abuts against the second abutting surface 513A from the front side towards the rear side, in the second direction. More specifically, in the second direction, the direction in which the front end section 524A abuts against the first abutting surface 515A is opposite to the direction in which the projecting section 522 abuts against the second abutting surface 513A. Therefore, the slide member 52 is guided so as to be sandwiched from either side in the front/rear direction, when moving in the left/right direction. Consequently, the slide member 52 is prevented from moving so as to deviate in position in the left/right direction, and the positional adjustment of the idle pulley 55 is performed smoothly.

Furthermore, in the present embodiment, a straight line which passes through the abutment point where the front end section 524A of the pulley shaft 524 abuts against the first abutting surface 515A and the abutment point where the projecting section 522 of the third wall section 521 abuts against the second abutting surface 513A is set so as to be parallel with the first direction (the left/right direction). Consequently, in the movement of the slide member 52, a turning moment is not liable to act on the slide member 52, and good slidability of the slide member 52 and the second carriage 560 is maintained.

Furthermore, by moving the elongated hole of the slide member 52 relatively in the first direction with respect to the screw hole of the second carriage 50, in other words, by means of the stroke of the elongated hole, the slide member 52 slidably moves with respect to the second carriage 50. Therefore, the slide member 52 can slide with respect to the second carriage 50, by means of a simple composition arranged on the slide member 52.

As described above, in the present embodiment, it is possible to achieve highly accurate positional adjustment of the idle pulley 55 which is arranged on the second carriage 50 that supports the second mirror 501 and the third mirror 502. Consequently, positional adjustment of the second mirror 501 and the third mirror 502 with respect to the upper frame 22 can be achieved satisfactorily. Even in a state where the wire 80 is wound around the idle pulley 55 from two opposing directions, it is possible to slide the idle pulley 55 in the left/right direction (the sub-scanning direction). Therefore, positional adjustment of the idle pulley 55 is carried out rapidly and accurately. Therefore, the work efficiency of the positional adjustment of the second mirror 501 and the third mirror 502 is improved. Moreover, the positional accuracy of the mirror in the image reading apparatus 5 is maintained, and good quality of an output image formed by the image forming unit 903 is maintained.

An image reading apparatus 5 and an image forming apparatus 1 including a slide member 52 relating to an embodiment of the present disclosure have been described above, but the present disclosure is not limited to this and various modifications such as the following, for example, can be adopted.

(1) In the embodiment described above, a composition is described in which a slide member 52 is arranged on a second carriage 50 which supports a second mirror 501 and a third mirror 502, but the invention is not limited to this. It is also possible to adopt a mode in which the slide member 52 is mounted on the first carriage 60 which supports the first mirror 62. In this case also, positional adjustment of the first mirror 62 is achieved satisfactorily by a smooth movement of the slide member 52 in the left/right direction (the sub-scanning direction).

(2) In the embodiment described above, as a mechanism for guiding the movement of the slide member 52, a composition including a front end section 524A of a pulley shaft 524 and a projecting section 522 which is provided to project from the third wall section 521 is described, but the invention is not limited to this. As a mechanism for guiding the sliding movement of the slide member 52, it is also possible to use a composition in which only the front end section 524A or the projecting section 522 is disposed. Furthermore, it is also possible to adopt a composition in which another projecting section is arranged on the supporting plate 520. Moreover, it is also possible to adopt a composition in which a projecting section, such as the front end section 524A and the projecting section 522, are arranged on the side of the main plate 510, rather than the slide member 52, and a wall section including a guide function such as the first wall section 515 and the first elongated hole 525 is arranged on the side of the slide member 52, rather than the side of the main plate 510.

The invention claimed is:

1. An image reading apparatus, comprising:
   an original document platform having an upper surface on which an original document is placed;
   a frame which supports the original document platform;
   a reflection carriage which is arranged inside the frame, includes a mirror for reflecting light reflected from the original document after being irradiated onto the original document, and is moved in a first direction along a sub-scanning direction with respect to the original document;
   a drive unit which generates drive force for moving the reflection carriage in the first direction;
   a wire which receives the drive force from the drive unit and moves the reflection carriage in the first direction;
   a pulley around which the wire is wound;
   a slide member which is installed on the reflection carriage, rotatably supports the pulley, and slidably moves in the first direction with respect to the reflection carriage;
   a projecting section which is provided to project in a second direction that intersects with the first direction in a plane in which the reflection carriage moves, on one of the reflection carriage and the slide member; and
   a guide section against which the projecting section abuts, the guide section being provided to extend in the first direction on the other of the reflection carriage and the slide member, on which the projecting section is not provided, wherein
   a front end of the projecting section has a hemispherical shape to thereby make point contact with the guide section.

2. The image reading apparatus according to claim 1, further comprising:
   a shaft section which is arranged on the slide member and serves as a rotational axis of rotation of the pulley, wherein the guide section is arranged on the reflection carriage, and the projecting section is arranged in the slide member on a front end of the shaft section passing through the pulley.

3. The image reading apparatus according to claim 1, further comprising:
   screw holes which are formed in the reflection carriage, and into which screws for fixing the slide member to the reflection carriage are fastened; and
   elongated holes which are opened in the slide member so as to extend in the first direction and are arranged so as to overlap with the screw holes,
   wherein the slide member slidably moves with respect to the reflection carriage by the elongated holes of the slide member moving relatively in the first direction with respect to the screw holes of the reflection carriage.

4. The image reading apparatus according to claim 1, further comprising:
   an auxiliary projecting section which is provided to project in the second direction on one of the reflection carriage and the slide member; and
   an auxiliary guide section against which the auxiliary projecting section abuts, the auxiliary guide section being provided to extend in the first direction on the other of the reflection carriage and the slide member, on which the auxiliary projecting section is not provided.

5. The image reading apparatus according to claim 4, wherein a straight line passing through an abutment point of the projecting section and the guide section and an abutment point of the auxiliary projecting section and the auxiliary guide section is parallel with the first direction.

6. The image reading apparatus according to claim 5, wherein a direction in which the projecting section abuts against the guide section is opposite to a direction in which the projecting section abuts against the auxiliary guide section, in the second direction.

7. The image reading apparatus according to claim 1, further comprising:
   a light source which irradiates light onto the original document, and a first mirror which reflects light that has been reflected from the original document;
   a projection carriage which is moved in the first direction by the wire; and
   the second mirror which is the mirror arranged in the reflection carriage and further reflects the light that has been reflected by the first mirror.

8. An image forming apparatus, comprising:
   an image reading apparatus which reads an image of an original document; and
   an image forming unit which carries out an image forming process in accordance with the image of the original document, wherein
   the image reading apparatus includes:
   an original document platform having an upper surface on which the original document is placed;
   a frame which supports the original document platform;
   a reflection carriage which is arranged inside the frame, includes a mirror for reflecting light reflected from the original document after being irradiated onto the original document, and is moved in a first direction along a sub-scanning direction with respect to the original document;
   a drive unit which generates drive force for moving the reflection carriage in the first direction;
   a wire which receives the drive force from the drive unit and moves the reflection carriage in the first direction;
   a pulley around which the wire is wound;

a slide member which is installed on the reflection carriage, rotatably supports the pulley, and slidably moves in the first direction with respect to the reflection carriage;

a projecting section which is provided to project in a second direction that intersects with the first direction in a plane in which the reflection carriage moves, on one of the reflection carriage and the slide member; and a guide section against which the projecting section abuts, the guide section being provided to extend in the first direction on the other of the reflection carriage and the slide member, on which the projecting section is not provided, the projecting section including a front end having a hemispherical shape to thereby make point contact with the guide section.

* * * * *